Sept. 13, 1932.   E. S. MacPHERSON   1,876,708
CRANK CASE CONSTRUCTION FOR ENGINES AND THE LIKE
Filed Feb. 25, 1929
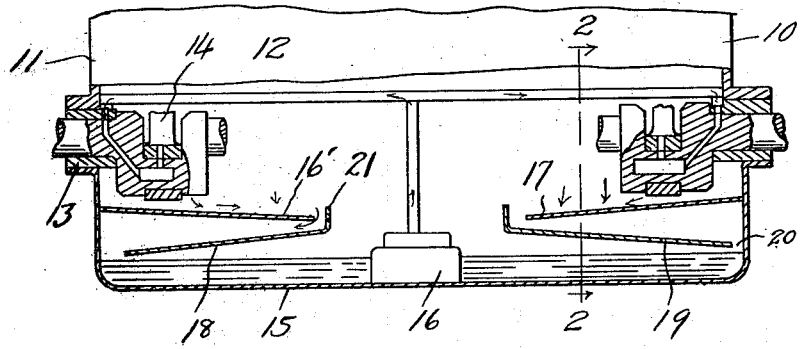
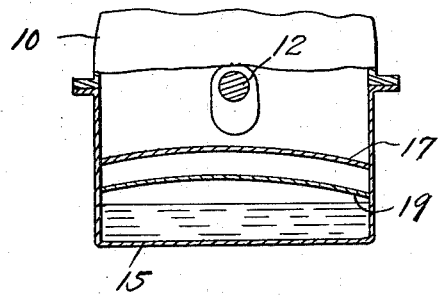
INVENTOR
Earle S. MacPherson
ATTORNEYS Patented Sept. 13, 1932

1,876,708

UNITED STATES PATENT OFFICE

EARLE S. MacPHERSON, OF DETROIT, MICHIGAN, ASSIGNOR TO HUPP MOTOR CAR CORPORATION, OF DETROIT, MICHIGAN, A CORPORATION OF VIRGINIA

CRANK CASE CONSTRUCTION FOR ENGINES AND THE LIKE

Application filed February 25, 1929. Serial No. 342,594.

This invention relates to crank case constructions for internal combustion engines and the like and has as one of its objects to provide means for discharging the lubricant draining from the engine bearings into the crank case at a point remote from the lubricant pump.

With the above, as well as other objects in view, the invention resides in the novel features of construction illustrated and about to be described.

In the drawing;

Figure 1 is a fragmentary semi-diagrammatic view of an internal combustion engine equipped with a crank case construction in accordance with this invention; and Figure 2 is a sectional view taken on the line 2—2 of Figure 1.

In internal combustion engines as now commercially produced it is conventional to provide baffles in the crank case for preventing the lubricant in the latter from splashing out of the same when the engine is tilted or otherwise disturbed from its normal position. These baffles usually extend across both ends of the crank case beneath the bearings of the engine and as a consequence intercept the lubricant draining from the bearings. In order to prevent this lubricant from accumulating upon the baffles and to permit the same to flow back into the crank case the baffles are usually inclined downwardly from the end walls of the crank case and terminate adjacent the lubricant pump. Thus it will be apparent that the baffles collect the lubricant draining from the bearings and discharge the same into the crank case adjacent the pump and as a consequence is immediately returned into circulation by the latter. This is objectionable owing to the fact that the lubricant dripping from the bearings is at a considerably higher temperature than the lubricant in the crank case and unless it is given a chance to radiate some of its heat, soon loses its viscosity and becomes unfit for lubricant purposes. With the present invention, however, the flow of the drainage into the lubricant pump is curtailed thereby permitting the drainage to expel a large percentage of its heat prior to being returned into circulation by the pump.

Referring now more in detail to the present construction it will be noted that there is illustrated in Figure 1 an internal combustion engine 10 having a block 11 and a crank shaft 12 journalled within suitable bearings 13 formed in the block. The crank shaft is preferably of conventional design and is provided with the connecting rod bearings 14. Secured to the bottom of the block is a crank case 15 adapted to contain a supply of lubricant and form a housing for a suitable lubricant pump 16. The latter is also of conventional design and is connected by suitable conduits to the various parts of the engine adapted to be lubricated.

In order to provide an efficient construction a pair of baffles 16' and 17 are arranged within the crank case for preventing the lubricant therein from splashing out of the same when the engine is tilted or otherwise moved from its normal position. The baffles 16' and 17 extend across opposite ends of the crank case and are secured to the sides and end walls of the latter by any suitable means. As shown the baffles extend inwardly from the end walls of the crank case to a point adjacent the pump and are preferably inclined downwardly toward the pump to permit the lubricant draining from the bearings upon the baffles to be conducted back into the crank case.

In order to prevent the lubricant collected by the baffles 16' and 17 from flowing directly into the crank case I provide a second pair of baffles 18 and 19 positioned beneath the baffles aforesaid so as to receive the lubricant discharged by the latter. The baffles 18 and 19 also extend across opposite ends of the crank case and are secured to the side walls of the crank case in any suitable manner. The outer ends of the baffles 18 and 19 are spaced a suitable distance from the end walls of the crank case to provide a passage 20 establishing communication with the crank case and the inner ends thereof extend inwardly beyond the ends of the baffles 16' and 17 and terminate in upwardly extending flanges 21. As shown in Figure 1 of the drawing the baffles 18 and 19 are inclined downwardly toward the end walls of the crank case. The arrangement is such that the lubricant collected by the baffles 16' and 17 instead of flowing directly into the crank case adjacent the pump 16 will flow upon the baffles 18 and 19 and owing to the fact that these latter baffles are inclined downwardly toward the end walls of the casing this lubricant will flow toward the latter through the passage 20 into the crank case at a point remote from the pump. Thus it will be apparent that by the time this lubricant reaches the pump for circulation thereby it will have expelled a large percentage of its heat. As shown in Figure 2, the baffles are arcuate in cross-section with the result that the lubricant deposited thereon flows against the side walls of the casing which serve to absorb and radiate a large percentage of the heat carried by the lubricant.

Thus from the foregoing it will be noted that I have provided a simple but effective means for discharging the lubricant draining from the bearings of the engine into the crank case at a point remote from the pump with the result that by the time this lubricant again reaches the pump for circulation the temperature of the same will be substantially normal.

What I claim as my invention is:

1. In an internal combustion engine, a crank case adapted to contain a supply of lubricant, a lubricant pump positioned within the crank case intermediate the ends thereof and operable to distribute lubricant upon certain parts of the engine, a baffle secured within the crank case above the lubricant supply and extending inwardly from one wall thereof to a point adjacent the pump, said baffle being inclined downwardly from the wall aforesaid toward the pump and operable to prevent the lubricant within the crank case from splashing out of the same and to collect the lubricant draining from the parts aforesaid of the engine, and a second baffle in the crank case disposed below the baffle aforesaid and inclined downwardly toward the said wall and spaced therefrom, said second baffle adapted to receive the lubricant collected by the first mentioned baffle and discharge the same into the crank case through the space between the outer end thereof and the wall aforesaid.

2. In an internal combustion engine, a crank case adapted to contain a supply of lubricant, a lubricant pump associated with the crank case for distributing lubricant upon certain parts of the engine, a baffle extending across one end of the crank case and contacting with the sides of the case for preventing the lubricant in the latter from splashing out of the same, said baffle terminating adjacent the pump and operable to collect the lubricant draining from the parts of the engine aforesaid and to cause the lubricant to flow in a direction toward the pump, and a second baffle positioned below the baffle aforesaid and adapted to collect the lubricant draining from the first mentioned baffle and discharge the same into the crank case at a point remote from the pump.

3. In an internal combustion engine, a crank case adapted to contain a supply of lubricant, a lubricant pump associated with the crank case and operable to withdraw lubricant from a point within the crank case and distribute the lubricant upon certain parts of the engine, a baffle arranged within the crank case above the normal level of the lubricant in the latter and inclined to cause the lubricant draining from the engine to flow in a direction toward the point aforesaid and means for collecting the lubricant draining from said baffle and operable to discharge said lubricant into the crank case at a point remote from the point above mentioned.

4. In an internal combustion engine, a crank case adapted to contain a supply of lubricant, a lubricant pump associated with the crank case and operable to withdraw lubricant from a point within the crank casing and deposit the lubricant upon certain parts of the engine, a baffle arranged above the normal level of the lubricant and engaging portions of the side walls of the casing, said baffle being bowed upwardly transversely of the casing to compel lubricant draining from the engine to flow into close proximity to the side walls aforesaid whereby the latter operate to absorb and radiate a large percentage of the heat carried by the lubricant.

5. In an internal combustion engine, a crank case adapted to contain a supply of lubricant, a lubricant pump associated with the crank case and operable to withdraw lubricant from a point within the crank casing and deposit the lubricant upon certain parts of the engine, a baffle disposed within the crank case above the normal level of the lubricant in the latter and inclined to cause the lubricant draining from the engine to flow in a direction toward the point aforesaid, said baffle being bowed upwardly transversely of the casing and operable to cause the lubricant to flow in close proximity to the side walls of the casing whereby the latter absorb and radiate a large percentage of heat carried by the lubricant.

6. In an internal combustion engine, a crank case adapted to contain a supply of lubricant, a lubricant pump associated with the crank case and operable to withdraw lubricant from a point within the latter and distribute the lubricant upon certain parts of the engine, a baffle disposed above the normal level of the lubricant in the crank case and inclined to cause the lubricant draining from the engine to flow in a direction toward the point aforesaid, and means collecting the lubricant draining from the baffle and operable to discharge the same into the crank case at a point remote from the point aforesaid.

7. In an internal combustion engine, a crank case adapted to contain a supply of lubricant, a lubricant pump associated with the crank casing and operable to withdraw lubricant from the latter at a point spaced from one end wall of the same and to distribute the lubricant upon certain parts of the engine, a baffle extending inwardly from the said end wall of the casing and inclined to cause the lubricant draining from the engine to flow toward the point aforesaid, and a second baffle below the said first-mentioned baffle and operable to collect lubricant draining from the latter and discharge the same into the crank case adjacent the end wall aforesaid.

8. In an internal combustion engine, a crank case adapted to contain a supply of lubricant, a lubricant pump associated with the crank case and operable to withdraw lubricant from a point within the latter spaced from an end wall of the same and to distribute the lubricant upon certain parts of the engine, a baffle disposed above the normal level of the lubricant and extending inwardly from the said end wall of the casing, said baffle being inclined toward the point aforesaid for compelling the lubricant draining from the engine to flow in a direction toward the said point, and a second baffle arranged below the baffle aforesaid and operable to collect lubricant draining from the latter and discharge the same into the crank case adjacent the end wall aforesaid, both of said baffles engaging opposite side walls of the casing and bowed upwardly transversely of the casing to compel the lubricant to flow into close proximity to the side walls whereby the latter absorb and radiate a large percentage of the heat carried by the lubricant.

9. In an internal combustion engine, a crank casing adapted to contain a supply of lubricant, a lubricant pump associated with the casing and operable to withdraw lubricant from a point intermediate the ends of the casing and to distribute the lubricant upon certain parts of the engine, a pair of baffles extending inwardly from opposite end walls of the casing and disposed above the normal level of the lubricant in the latter, said baffles terminating adjacent the point aforesaid and inclined toward the same for compelling the lubricant draining from the engine to flow in a direction toward the said point, a baffle arranged below each of the baffles aforesaid and operable to collect the lubricant draining from the latter, said second baffles being inclined downwardly toward the end walls of the casing for discharging the lubricant into the crank case at points adjacent the end walls of the same.

In testimony whereof I affix my signature.

EARLE S. MacPHERSON.